(12) United States Patent
Tsukizaki

(10) Patent No.: US 7,079,136 B2
(45) Date of Patent: Jul. 18, 2006

(54) RENDERING METHOD OF RENDERING IMAGE ON TWO-DIMENSIONAL SCREEN

(75) Inventor: Shinya Tsukizaki, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 468 days.

(21) Appl. No.: 09/997,206

(22) Filed: Nov. 29, 2001

(65) Prior Publication Data

US 2002/0075262 A1 Jun. 20, 2002

(30) Foreign Application Priority Data

Dec. 19, 2000 (JP) .............................. 2000-385158
Oct. 24, 2001 (JP) .............................. 2001-326319

(51) Int. Cl.
G06T 15/40 (2006.01)

(52) U.S. Cl. ..................................... 345/422

(58) Field of Classification Search ................ 345/421, 345/419, 473
See application file for complete search history.

(56) References Cited

U.S. PATENT DOCUMENTS

| 4,918,625 A | * | 4/1990 | Yan ............................. 345/592 |
| 5,990,904 A | * | 11/1999 | Griffin ........................ 345/631 |
| 6,618,048 B1 | * | 9/2003 | Leather ....................... 345/422 |
| 2002/0130820 A1 | * | 9/2002 | Sullivan | |

FOREIGN PATENT DOCUMENTS

| JP | 61-159680 | 7/1986 |
| JP | 08-314429 | 11/1996 |

OTHER PUBLICATIONS

Foley et al. Computer Graphics: Principles and Practice. Addison-Wesley Pub. Co. 1997. p. 668-672.*
Loren Carpenter. The A-buffer, an Antialiased Hidden Surface Method. Computer Graphics. ACM Press. vol. 18. No. 3. Jul. 1984.*
Mulder, et al., "Pixel Masks for Screen-Door Transparency" 1998 IEEE, pp. 351-358 & 550.

* cited by examiner

Primary Examiner—Ulka Chauhan
Assistant Examiner—Peter-Anthony Pappas
(74) Attorney, Agent, or Firm—Katten Muchin Rosenman LLP

(57) ABSTRACT

A frame where a two-dimensional image is formed is subdivided into predetermined unit areas, and a desired range is determined in the frame, and further, a determination is made whether or not overwrite rendering is possible for each unit area in the desired range. By doing so, it is possible to visibly display an object hidden by a shade of another object without carrying out a determination process relative to a positional relationship between a virtual viewpoint and object and a semi-transparency processing for making object semitransparent, and to realize the display process at high speed and low cost.

4 Claims, 9 Drawing Sheets

RENDERING METHOD OF RENDERING IMAGE ON TWO-DIMENSIONAL SCREEN

This application is related to Japanese Patent Application No. 2000-385158 filed on Dec. 19, 2000, and No. 2001-326319 filed on Oct. 24, 2001, based on which this application claims priority under the Paris Convention and the contents of which are incorporated herein by reference.

BACKGROUND OF THE INVENTION

1. Field of the Invention

The present invention relates to a rendering method and a rendering apparatus where an image is rendered on a two-dimensional screen such as a television monitor or the like, to a computer-readable recording medium on which a rendering program executed by a computer is recorded, a program processor for executing a rendering program, and a rendering program executed by a computer.

2. Description of the Related Art

Recently, for a television game machine or a personal computer, such as high integration and high speed of a processor and a memory has been performed. As a result, for example, it is possible to generate a three-dimensional image having a sense of presence and depth in real time, and to render the image on a two-dimensional monitor screen.

In the case of rendering a three-dimensional image on the two-dimensional monitor screen, geometry processing such as a coordinate transformation processing, a clipping processing, a lighting processing are performed on three-dimensional polygon data, and as a result, data obtained from the result of the above processing is subjected to perspective projection transformation.

Now, in the case of rendering the three-dimensional image on the two-dimensional monitor screen, for example, as shown in FIG. 1, there is a case where a certain object A exists in a visual field (frame F) from a virtual viewpoint, and further, another object B exists between the object A and the above virtual viewpoint. In this case, an image when viewing from the virtual viewpoint looks like an image such that the object A is partially shielded by the object B.

As this example, in a case that a positional relationship appears such that the object B exists between the virtual viewpoint and the object A, for allowing the object A to be viewed from the above virtual viewpoint, the object B may be rendered to be semitransparent, for example, as shown in FIG. 2. In other words, the object B is rendered in a state of being semitransparent, and thereby, in a portion ab where the object B overlaps with the object A, it is possible to see the object A through the semitransparent object B.

In a conventional rendering apparatus, in the case of rendering the image as shown in FIG. 2, first, as a first process, whether or not another body (object or the like) exists between the virtual viewpoint and the object A is determined in advance. In this first process, it is recognized that the object B exists in the example shown in FIG. 2. Subsequently, as a second process, the object B is rendered to be semitransparent.

The conventional rendering apparatus carries out the first and second processes, and thereby, renders an image such that the object A is seen from the virtual viewpoint even if a positional relationship appears such that the object B exists between the virtual viewpoint and the object A.

However, in order to carry out a determination process such as the above first process, there is a need of making a great many of operations for calculating a distance between the virtual viewpoint and each of the objects A and B. For this reason, a long processing time is required. Therefore, for example, in the case of rendering a three-dimensional image comprising a great many of objects in real time, the image processing is not fully performed. As a result, there is a possibility that the three dimensional image is incorrectly or incompletely rendered.

For example, in this case where the rendering apparatus is equipped with a very high speed computable CPU (Central Processing Unit), it is possible to shorten the time spent for the above determination process. However, the very high speed computable CPU is expensive. For this reason, there is a problem of increasing a cost of the rendering apparatus.

Moreover, the above second process, that is, semi-transparency processing is generally carried out at a unit of polygon. Therefore, for example, in the case where the object A is significantly smaller than the object B, a problem occurs such that a portion that should not be made semitransparent becomes semitransparent in the object B. As described above, when a portion that should not be made semitransparent becomes semitransparent, for example, other objects and the like are transparent. Therefore, the images are unnatural and significantly having trouble seeing.

SUMMARY OF THE INVENTION

The present invention has been made in view of the above problem in the prior art. Accordingly, an object of the present invention is to provide a rendering method and a rendering apparatus, which can display an object hidden by a shade of another object and the like in a visible state without carrying out such as a determination process relative to a positional relationship between a virtual viewpoint and object and a semi-transparency processing for making object semitransparent, and can perform a display process at high speed and low cost, and to a computer-readable recording medium on which a rendering program executed by a computer is recorded, a program processor for executing a rendering program, and a rendering program executed by a computer.

According to one aspect of the present invention, a frame in which a two-dimensional image is formed is subdivided into each predetermined unit area, and a desired range is determined in the frame, and further, it is determined whether or not overwrite rendering is possible for each unit area in the desired range.

In particular, according to another aspect of the present invention, a rendering range where a desired object should be rendered in a frame, or a rendering range where a desired object is rendered in a frame, is determined as a desired range. Further, of each unit area in the desired range, with respect to a unit area in response to a predetermined regular pattern, it is determined whether or not overwrite rendering is possible. By doing so, a desired object which is shielded by other objects from the virtual viewpoint, for example, is rendered as seen to be semitransparent by appearance.

Other and further objects and features of the present invention will become obvious upon understanding of the illustrative embodiments about to be described in connection with the accompanying drawings or will be indicated in the appended claims, and various advantages not referred to herein will occur to one skilled in the art upon employing of the invention in practice.

DETAILED DESCRIPTION OF THE PREFERRED EMBODIMENTS

Figure 1:
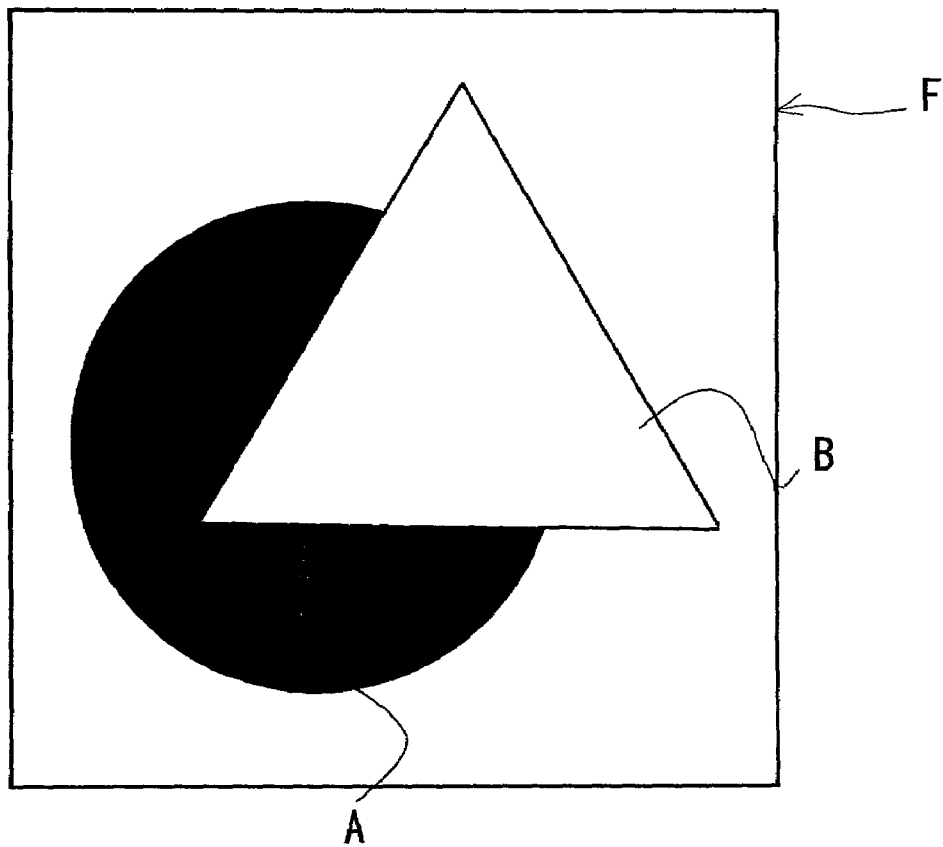
FIG. 1 is a view to explain an image of a state that an object A is partially shielded by an object B from the view of a virtual viewpoint.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Configuration of Rendering Apparatus of Present Embodiment

Figure 3:
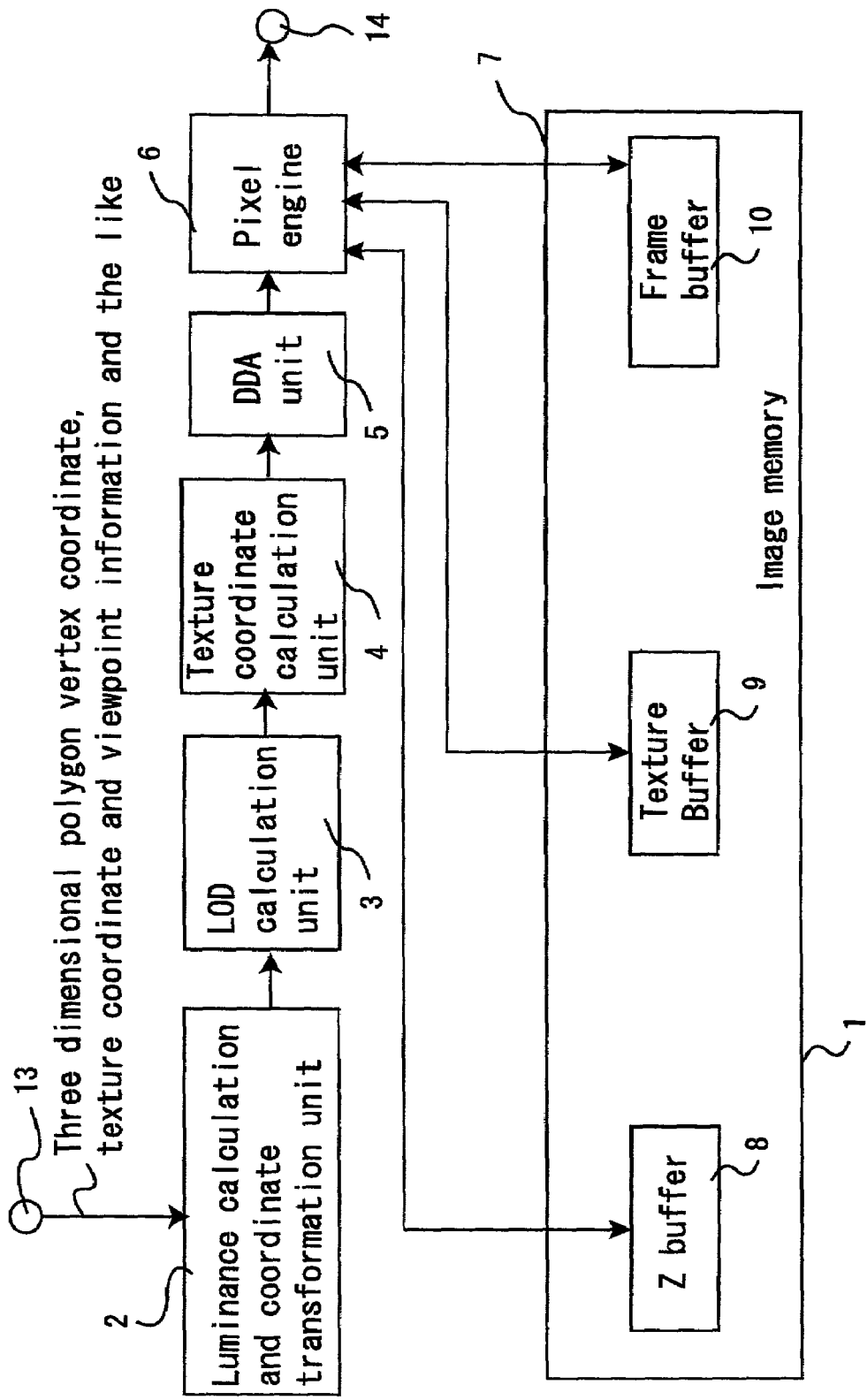
FIG. 3 is a diagram schematically showing an example of a configuration of principal parts of a rendering apparatus according to one embodiment of the present invention.

FIG. 3 schematically shows a configuration of rendering apparatus 1 of the present embodiment. The rendering apparatus 1 of this embodiment is an apparatus which renders a two-dimensional image by texture mapping to a three-dimensional polygon. For example, the apparatus is applicable to a television game machine, a personal computer, and a three-dimensional graphic device, or the like.

In FIG. 3, the rendering apparatus of this embodiment includes a luminance calculation and coordinate transformation unit 2 (hereinafter, referred to as LC/CT unit 2), an LOD (Level Of Detail) calculation unit 3, a texture coordinate calculation unit 4, a DDA (Digital Differential Analyzer) unit 5, a pixel engine 6, and an image memory 7, as principal constituent elements.

The above image memory 7 comprises the storage areas of: a Z buffer 8 storing a Z-direction value (Z coordinate value) from a virtual viewpoint, a texture buffer 9 storing a basic texture for generating the entire pattern on polygon by mapping, or a modulation texture for amplitude-modulating a pattern generated by mapping of the basic texture or the like, and a frame buffer 10 used for storing and synthesizing a frame data (two-dimensional image data) displayed on a two-dimensional monitor screen.

As various information for rendering a three-dimensional image, for example, three-dimensional polygon information, texture information, light source information and viewpoint information and the like are inputted to an input terminal 13 of the rendering apparatus 1 including each constituent element. Moreover, these various information are supplied via a communication line or storage device or the like.

The polygon information is information composed of each vertex (x, y, z) coordinate of a triangular polygon, for example, and a normal of each vertex. The texture information is the information composed of pixel information and a texture coordinate corresponding to each vertex of triangular polygon. The viewpoint information and light source information are information for carrying out a luminance calculation and coordinate transformation with respect to polygon. The light source information may be information indicative of a plurality of light sources, and is not limited to one light source. In addition, the polygon vertex information includes various information such as color information, or a fog value for giving an effect such that a far object is foggy. These various information are first inputted to the luminance calculation and coordinate transformation unit 2 of the rendering apparatus 1.

The LC/CT unit 2 converts (transforms) the inputted polygon coordinate information thus inputted into a coordinate value on a two-dimensional rendering coordinate system based on the viewpoint information, and calculates a luminance of each polygon vertex based on the viewpoint information and light source information. Moreover, the LC/CT unit 2 makes the above calculation while carrying out a perspective transformation or the like. Each value calculated by the LC/CT unit 2 is inputted to the LOD calculation unit 3.

The LOD calculation unit 3 calculates an LOD (Level Of Detail) value used when the pixel engine 6 reads a basic texture from the texture buffer 9, from the converted polygon z coordinate. In this case, the LOD value is a value calculated from a reduction ratio used when reducing a polygon. The reduction ratio is determined as a logarithm of distance from the viewpoint to polygon. Further, the above LOD value is sent to the pixel engine 6 via the texture coordinate calculation unit 4 and the DDA unit 5.

The texture coordinate calculation unit 4 calculates a texture coordinate value used when the pixel engine 6 reads a modulation texture from the texture buffer 9, from a texture coordinate value of the basic texture. These texture coordinate values are sent to the pixel engine 6 via the DDA unit 5.

The DDA unit 5 converts the above two-dimensional polygon vertex information, Z coordinate value and luminance information or the like into pixel information. More specifically, a coordinate value, a Z coordinate value luminance and a texture coordinate of each pixel are successively determined by linear interpolation. An output from the DDA unit 5 is sent to the pixel engine 6.

The pixel engine 6 controls the read and write of the Z buffer 8, the texture buffer 9 and the frame buffer 10, and carries out texture mapping using texture information read from the texture buffer 9 and pixel information obtained from the DDA unit 5, Z coordinate comparison, and pixel value calculation.

Moreover, in the pixel engine 6, when carrying out the above texture mapping, mapping to a three-dimensional polygon is carried out by a so-called MIPMAP method using the basic texture stored in the texture buffer 9.

The above MIPMAP method is a method of preparing a texture having different size, that is, 1/2, 1/4, 1/8 . . . (ratio of each side length) as a texture pasted on a three-dimensional polygon, and selecting the prepared texture in accordance with a reduction ratio, and further, carrying out mapping with respect to the three-dimensional polygon. According to the above MIPMAP method, as described above, the texture reducing the original texture is mapped to the polygon, and thereby, it is possible to prevent a generation of aliasing in the case where the polygon is reduced.

Moreover, in texture mapping, in the case where a higher frequency component is applied to the above basic texture, the pixel engine 6 carries out texture mapping using the modulation texture stored in the texture buffer 9.

Further, the pixel engine 6 carries out scissoring, dithering, color clamp or the like, and further, conducts a α test as the need arises. The above scissoring is a process for removing a data projecting from a screen, and dithering is a process for combining an arrangement of color for representing many colors by a few colors. The color clamp is a process for giving a limitation so that a value does not exceed 255 or does not become smaller than zero in color calculation. The above α test is a process for carrying out a control whether or not a α value of each pixel, that is, texture should be rendered by a coefficient value indicative of an image blend ratio in the case of mapping.

In the pixel engine 6, an image data obtained from the above each process is stored in the frame buffer 10, and then, a frame data (two-dimensional image data) rendered on a two-dimensional monitor screen is formed. Thereafter, the two-dimensional image data thus formed is read from the frame buffer 10, and then, is outputted from an output terminal 14, and thus, is supplied to a two-dimensional monitor.

First Embodiment of Rendering Processing

Figure 2:
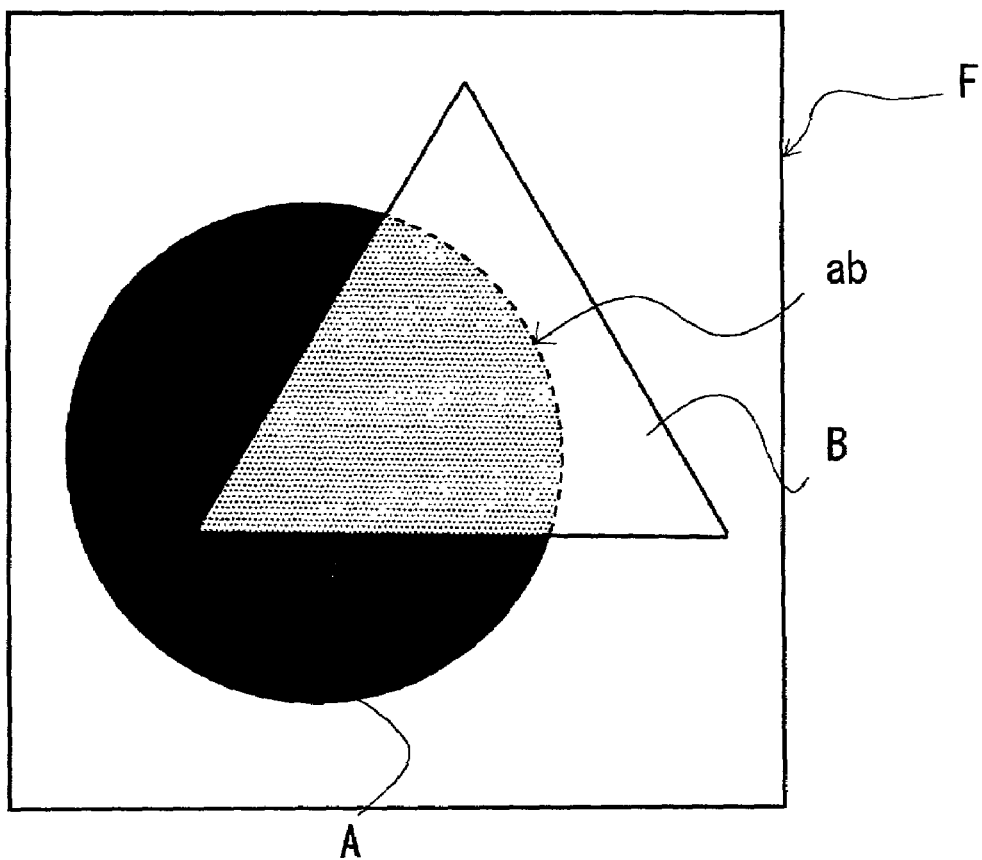
FIG. 2 is a view to explain an image obtained by determination processing relative to a positional relationship between conventional virtual viewpoint and object, and object semi-transparency processing.

As described above in FIG. 1, for example, the positional relationship exists such that an object A exists in a visual field (frame F) from the virtual viewpoint, and further, another object B exists between the object A and the virtual viewpoint. In this case, the rendering apparatus of this embodiment can generate an image displaying the object A hidden by a shade of the object B in a visible state without carrying out a determination process relative to a positional relationship between the virtual viewpoint as described above in FIG. 2 and object, and an object semi-transparency processing.

Hereinafter, in the rendering apparatus having a configuration shown in FIG. 3, a flow of rendering processing of the first embodiment of the present invention will be described with reference to FIG. 4 and FIG. 5 to FIG. 7 at the time of generating an image capable of visibly displaying the object A hidden by the shade of the object B.

Figure 4:
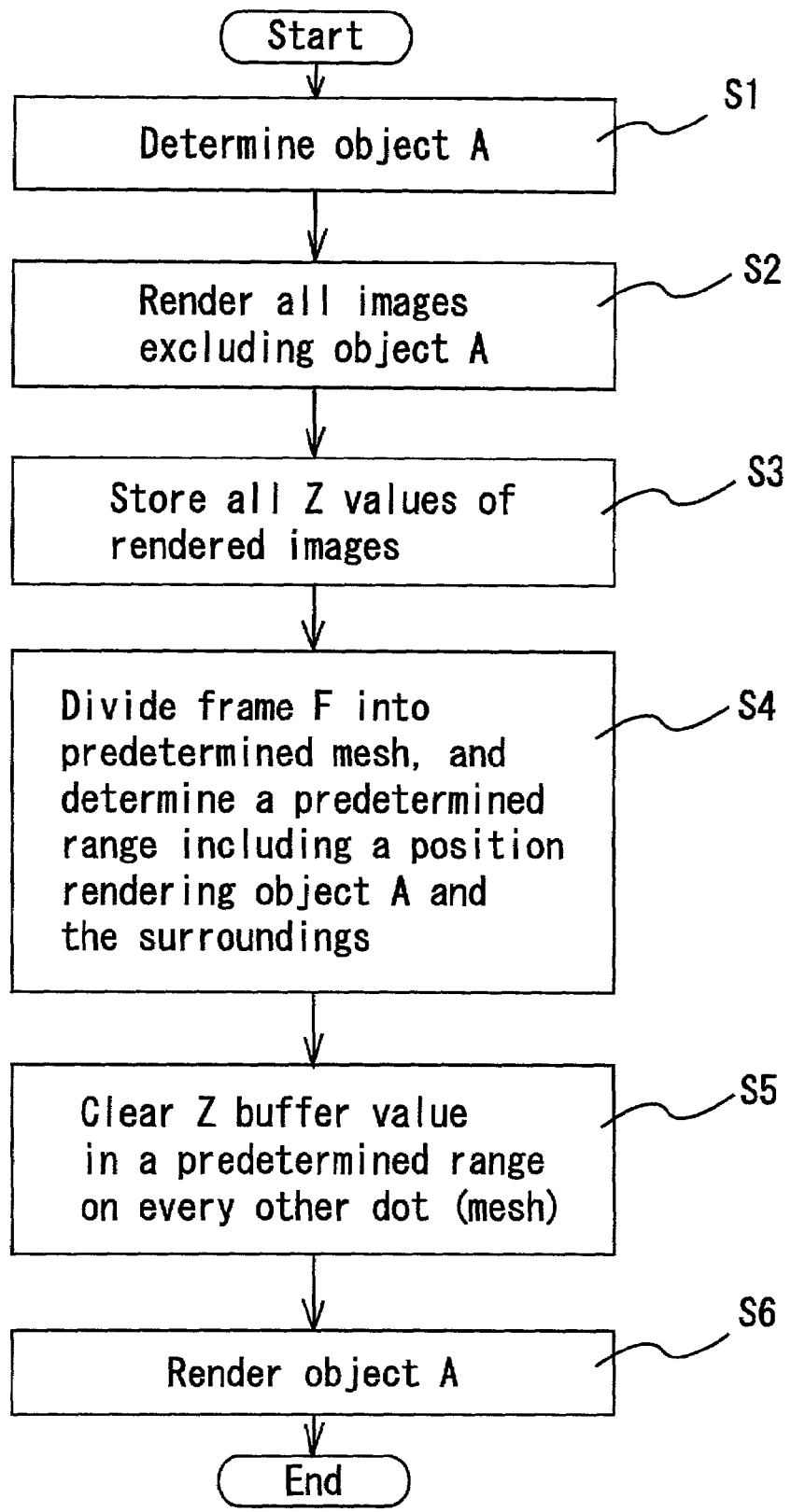
FIG. 4 is a flowchart showing a flow of rendering processing according to a first embodiment of the present invention.

In FIG. 4, first, as a processing of step S1, the pixel engine 6 determines an object (object A) to be visibly displayed.

Figure 5:
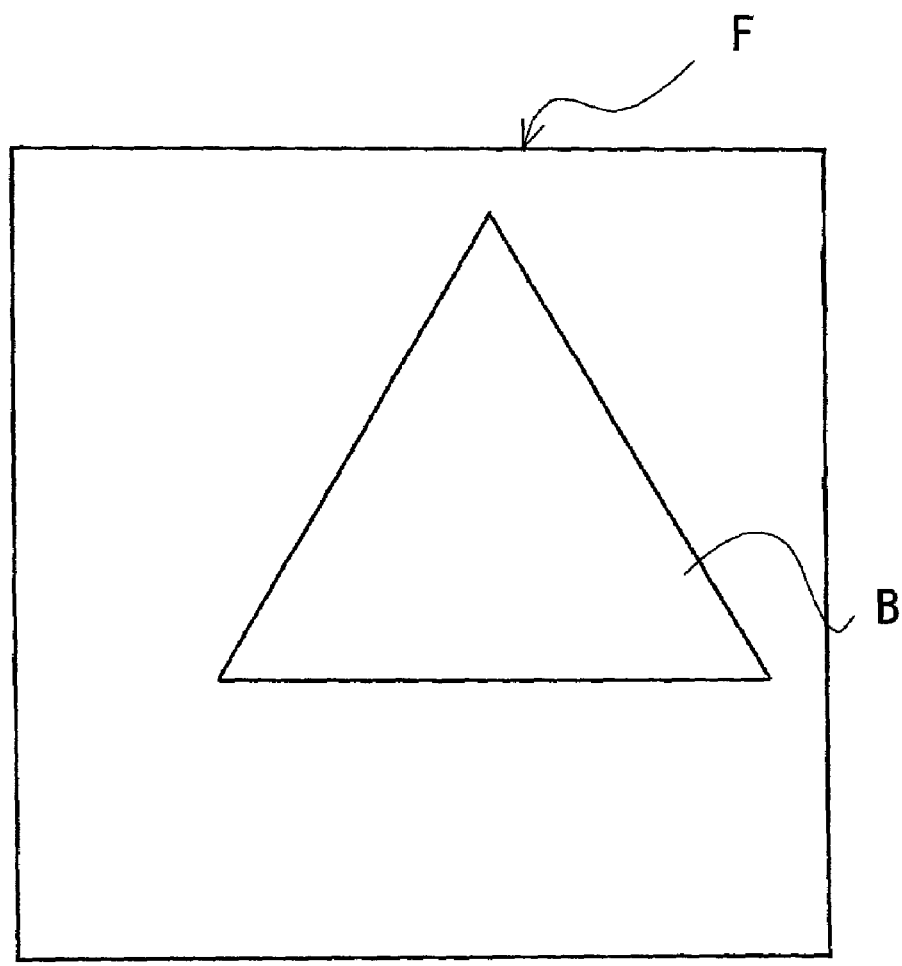
FIG. 5 is a view showing a state that an object B is rendered in a frame by a processing of step S2 shown in the flowchart of FIG. 4.

Next, as a processing of step S2, the pixel engine 6 forms (renders) all image excluding the above object A of objects to be rendered in the visual field (frame F) from the virtual viewpoint on the frame buffer 10. In this embodiment, by the process of step S2, the object B is rendered in the frame F as shown in FIG. 5.

Further, as a processing of step S3, the pixel engine 6 writes a Z value (distance from virtual viewpoint (Z coordinate value)) of each pixel in the Z buffer 8 with respect to all images rendered in the frame F. In this embodiment, the Z coordinate value of the virtual viewpoint is set to the maximum value and an infinite Z coordinate value is set to the minimum value.

Figure 6:
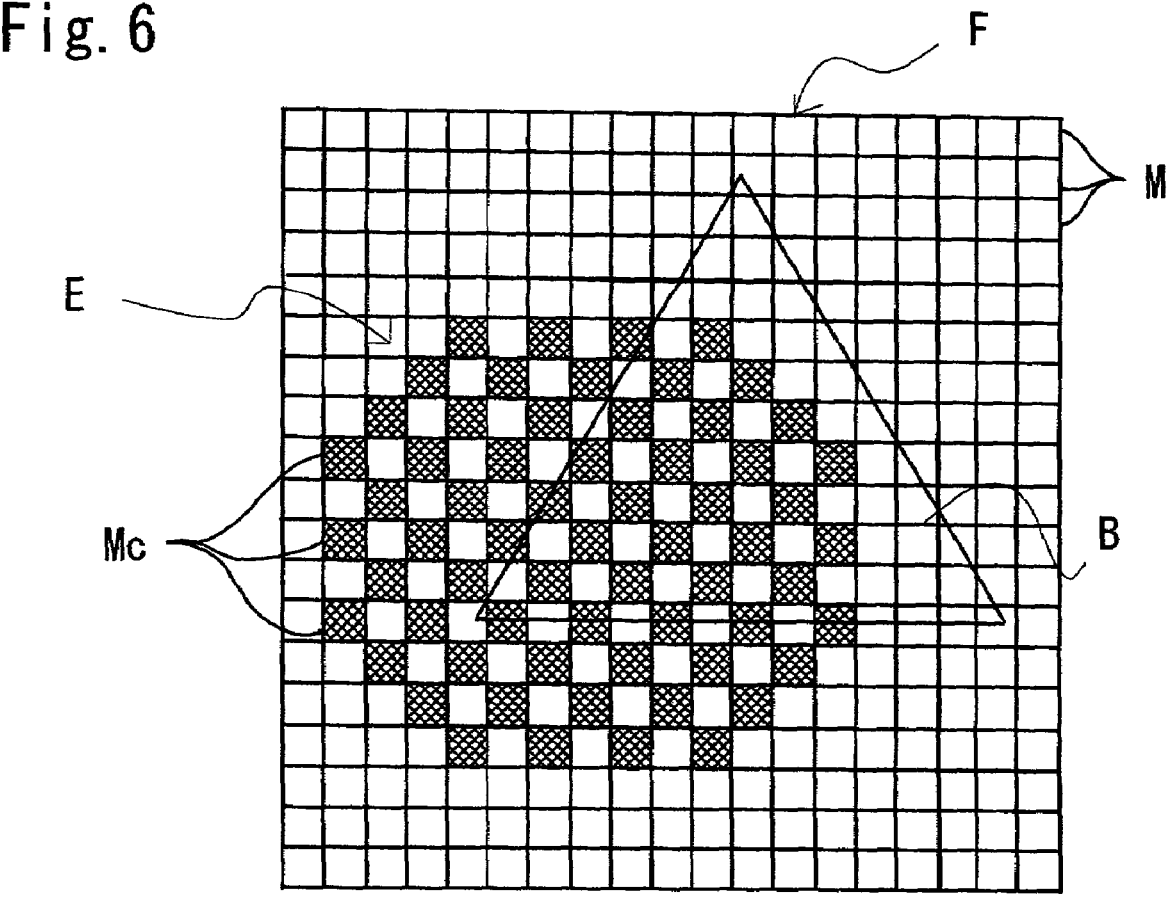
FIG. 6 is a view to explain meshing of frame F, a predetermined range E and mesh Mc for processing of clearing a Z value.

Next, as a processing of step S4, the pixel engine 6 divides the frame F into a unit area having a predetermined size (hereinafter, referred to as mesh M) as shown in FIG. 6, and further, determines a predetermined range (including the surroundings as the need arises) E where the above object A should be rendered. In the example shown in FIG. 6, the mesh M has a shape of square such as n×m (n, m=1, 2, 3 . . .) pixel. In this case, the mesh M is not limited to the square, and may have a shape of triangle, polygon such as honeycomb, circle and the like, for example. One mesh may be one pixel.

Next, as a processing of step S5, the pixel engine 6 deletes a Z value corresponding to each pixel included in mesh Mc on every other dot (every other mesh) of the mesh M included in the predetermined range E determined in the above step S4 from the Z buffer 8, or sets it to infinite (hereinafter, referred to as clearing processing).

In other words, to clear the Z value with respect to the mesh Mc means that overwrite rendering is possible with respect to the mesh Mc subjected to clearing processing. More specifically, for example, of the mesh M included in the predetermined range E and the object B, the mesh Mc having the Z value subjected to clearing processing means that the object A image can be overwritten and rendered on the object B image even if the object A is further from the virtual viewpoint than the object B.

After the processing of steps S5, in step S6, the pixel engine 6 renders the object A in the frame F.

As described above, even if the object B exists between the object A and the virtual viewpoint, the finally rendered object A image is rendered on each mesh Mc having the Z value subjected to clearing processing.

Figure 7:
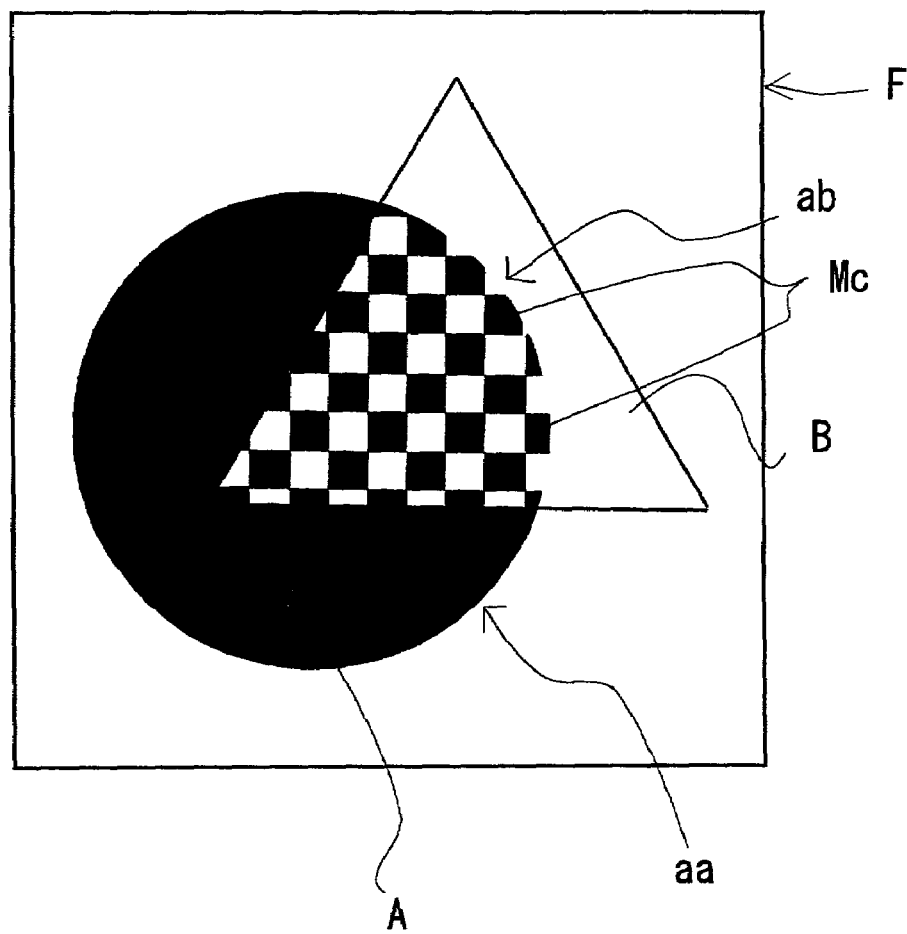
FIG. 7 is a view to explain showing an image, which is made semitransparent by rendering according to one embodiment of the present invention.

In other words, as shown in FIG. 7, when viewing from the virtual viewpoint, in a portion ab overlapping with the object B, the object A image is overwritten and rendered at the portion of mesh Mc having the Z value subjected to clearing processing. As a result, the object B becomes semitransparent, and therefore, the object A is seen through there. Moreover, when viewing from the virtual viewpoint, in a portion aa of the object A, which does not overlap with the object B, the object a image is intactly rendered. As a matter of course, in the case where no other object exists between the virtual viewpoint and the object A, the entirety of the object A is intactly rendered.

Moreover, in the example of FIG. 6 or FIG. 7, the size of each mesh is illustrated larger so as to be clarified in the drawings. As a result, the portion ab where the object B overlaps with object A is illustrated like a checkered pattern as shown in FIG. 7. However, in fact, each mesh has a very small size; therefore, the portion ab is not seen like the above checkered pattern, and an image is displayed such that the object A is seen to be semitransparent.

Second Embodiment of Rendering Processing

In the above rendering processing of the first embodiment, the frame F is divided into the mesh M, and clearing processing is made with respect to the Z value corresponding to each pixel included in each mesh Mc on every other dot (every other mesh) of the mesh M included in the predetermined range E where the object A should be rendered. By doing so, a semitransparent image has been realized. In the following rendering of the second embodiment, it is possible to realize the same semitransparent image as the above first embodiment.

Figure 8:
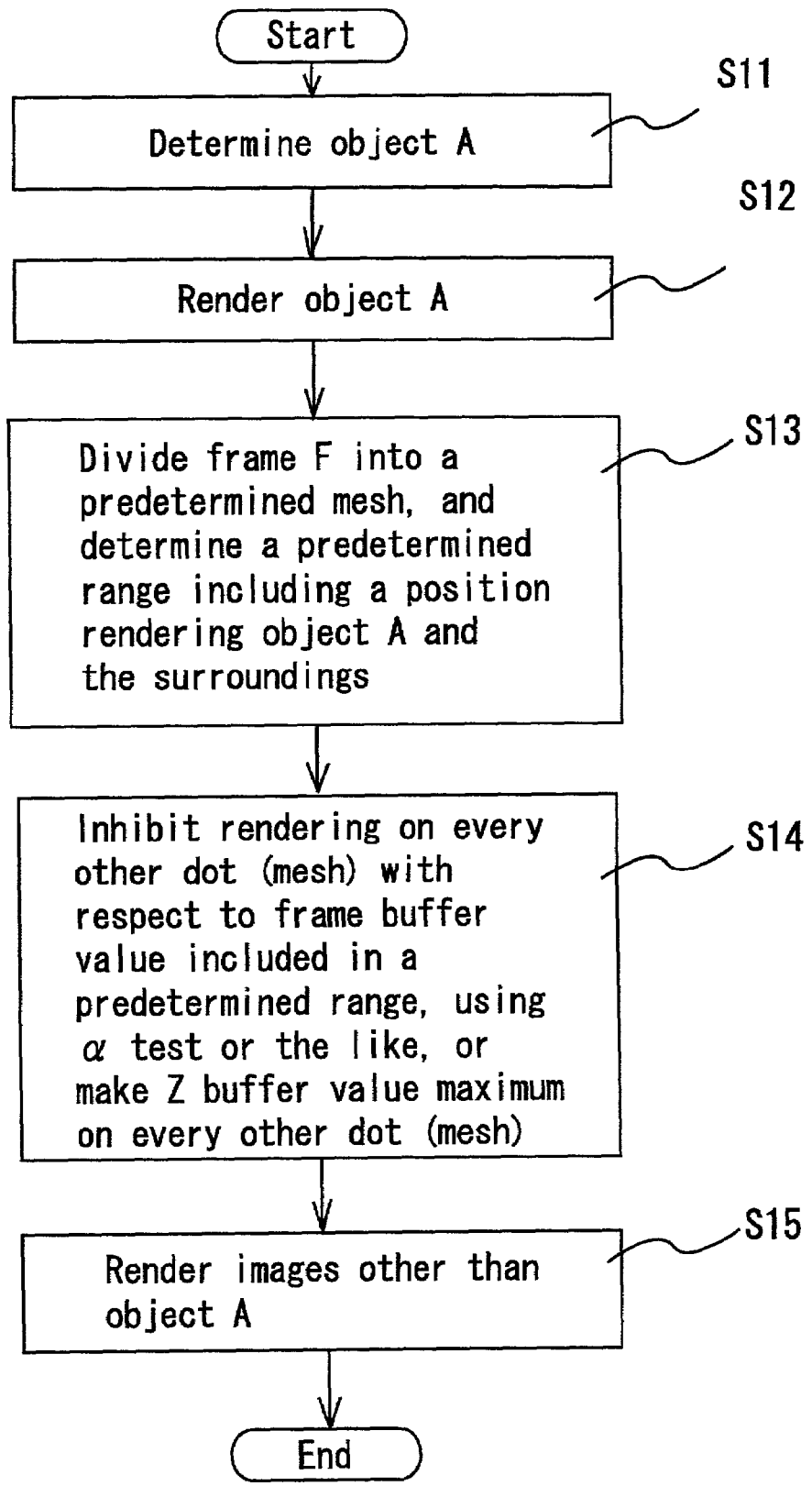
FIG. 8 is a flowchart showing a flow of rendering processing according to a second embodiment of the present invention.

With reference to FIG. 8, a rendering flow of the second embodiment of the present invention will be described below.

In FIG. 8, first, as a processing of step S11, the pixel engine 6 determines the object A in the same manner as the step S1 of FIG. 4.

Next, as a processing of step S12, the pixel engine 6 previously renders the object A in the visual field (frame F) from the virtual viewpoint.

Next, as a processing of step S13, the pixel engine 6 divides the frame F into a mesh M having a predetermined size similar to the example of FIG. 6, and further, determines a predetermined range E where the object A is rendered. In this second embodiment, it is desirable that the predetermined range E is only range rendering the object A. Moreover, in this second embodiment, the mesh M is not limited to a shape of square as described in the above first embodiment.

Next, as a processing of step S14, the pixel engine 6 makes the above α test with respect to a frame buffer value corresponding to each pixel included in each mesh Mc on every other dot (every other mesh) of the mesh M included in the predetermined range E, and thereby, inhibits rendering of pixel of other objects. More specifically, for example, a α value of each pixel is set to 0% (minimum value), and thereby, control is made so that the pixel of other objects is not blended, or the Z value corresponding to each pixel included in each mesh Mc is set to the maximum value (Z coordinate value of virtual viewpoint), and thereby, in fact, the pixel of other objects is inhibited from being rendered.

In this embodiment, for case that the Z coordinate value of the virtual viewpoint is set to the minimum value and the infinite Z coordinate value is set to the maximum value, the Z coordinate value corresponding to each pixel included in the mesh Mc is set to the minimum (Z coordinate value of the virtual viewpoint) to thereby inhibit rendering the pixel of other objects.

In other words, to inhibit the above mesh Mc from being rendered means that the mesh Mc having rendering inhibition cannot be newly overwritten and rendered. More specifically, of the mesh M included in the predetermined range E, the mesh Mc having rendering inhibition means that the object B image is not overwritten and rendered on the previously rendered object A image, even if the object B is closer to the virtual viewpoint than the object A.

After the processing of step S14, as a processing of step S15, the pixel engine 6 renders an image other than the object A in the frame F. By doing so, even if the object B exists between the objects and the virtual viewpoint, the pixel of other objects is inhibited from being rendered on each mesh Mc. Therefore, the object A image is not overwritten by the object B image; as a result, the object A image remains therein.

In other words, similar to the case of FIG. 7, in the portion ab of the object A overlapping with the object B when viewing from the virtual viewpoint, the object A image remains in each mesh Mc portion; as a result, the object B is seen in a state of being semitransparent, so that the object A can be intactly seen. Further, in the portion aa of the object A, which does not overlap with the object B when viewing from the virtual viewpoint, the object A image remains intactly. Of course, in the case where no other object exists between the virtual viewpoint and the object A, the entirety of the object A intactly remains therein.

In the pixel engine 6, the process shown in the flowchart shown in FIG. 4 and FIG. 8 may be realized by a hardware such as a DSP, or may be realized by a software such as a CPU using a rendering processing program transmitted via communication line and a rendering processing program read from storage medium by storage device. In particular, in the case where rendering by the pixel engine 6 is realized by software, the rendering processing program is a program of successively performing each step described in a flow chart of FIG. 4 or FIG. 8. The rendering processing program may be prepared as a processing program for the pixel engine 6, and in addition, may be previously inputted together with the polygon information from the input terminal 13 of FIG. 3.

Figure 9:
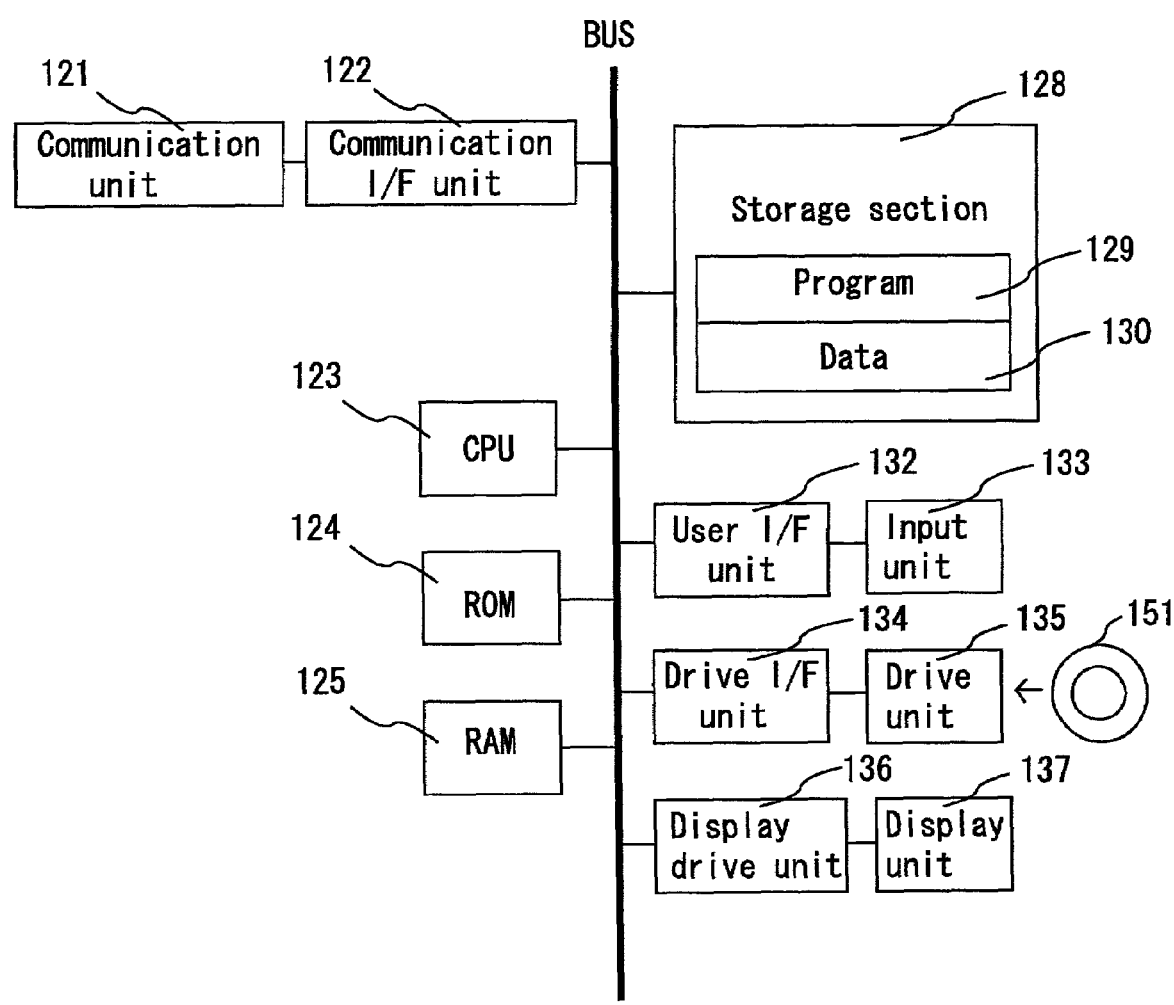
FIG. 9 is a block diagram showing an overall constitution of a personal computer for executing a rendering processing program whose process flow was shown in FIG. 4 or FIG.8.

As a specific example of a constitution for embodying the rendering processing of this embodiment on the software basis, FIG. 9 shows an overall constitution of a personal computer on which the rendering processing program whose process flow was shown in FIG. 4 or FIG. 8 is run. Now in this embodiment, the rendering processing program is mainly executed by a CPU 123 shown in FIG. 9.

In FIG. 9, a storage section 128 comprises, for example, a hard disk and a driver therefore. The hard disk has stored therein an operating program; rendering processing program 129 of this embodiment incorporated for example by installation from various recording media such as a CD-ROM and DVD-ROM, or downloading via a communication line; and various data 130 typically including graphic information for polygon drawing, texture, Z value, general texture, color value and α value.

The communication section 121 is a communication device responsible for data communication with the external, such as a modem allowing connection to an analogue public telephone line, a cable modem allowing connection to a cable television network, a terminal adaptor allowing connection to ISDN (Integrated Services Digital Network), and a modem allowing connection to ADSL (Asymmetric Digital Subscriber Line). A communication interface section 122 is an interface device responsible for protocol conversion that enables data exchange between the communication section 121 and an internal bus.

An input section 133 is an input device such as a keyboard, mouse and touch pad. A user interface section 132 is an interface device for supplying signals from the input section 133 to the internal section.

A drive section 135 is a drive device capable of reading various data and programs including the rendering processing program according to this embodiment from a recording medium 151 such as a card-type semiconductor memory. A drive interface section 134 is an interface device for supplying signals from the drive section 135 to the internal section.

A display section 137 is a display device such as a CRT (cathode ray tube) or LCD (liquid crystal display). A display drive section 136 is a drive device responsible for driving such display section 137 for display.

A ROM 124 typically comprises a rewritable non-volatile memory such as a flash memory, and stores a BIOS (Basic Input/Output System) and various initial set values of the personal computer. A RAM 125 is a device into which application programs read out from the hard disk in the storage section 128 or various data are loaded, and is used as a working RAM for the CPU 123.

The CPU 123 controls the entire operations of the personal computer as well as executes the foregoing rendering processing based on the operating system programs or the rendering processing program 129 of this embodiment stored in the storage section 128. That is, in the constitution shown in FIG. 9, the CPU 123 executes the rendering processing program of this embodiment, which is one of the application programs read out from the hard disk of the storage section 128 and loaded into the RAM 125, to thereby enable the rendering processing described in the foregoing embodiment.

As described above, according to the first and second embodiments of the present invention, the frame F is divided into the mesh M, and it is determined whether or not overwrite rendering is possible for each mesh M in a predetermined range E where a predetermined object A should be rendered. More specifically, the Z value of each mesh Mc is subjected to clearing processing on every other dot (every other mesh), or other objects are inhibited from being rendered. By doing so, it is possible to visibly display an object hidden by a shade of another object without carrying out a determination process relative to a positional relationship between a virtual viewpoint and object and a semi-transparency processing for making object semitransparent at high speed and low cost.

Moreover, in the present embodiments, the above Z value subjected to clearing processing and rendering inhibitions of other objects are set at pixel unit. Therefore, even if the object A is very smaller than the object B, no problem arises such that a portion of the object B, which should not be made semitransparent, becomes semitransparent, as the conventional transparency processing.

A description of each embodiment is an example of the present invention. Therefore, the present invention is not limited to the above embodiments, and various changes may be made in accordance with a design within a scope without diverging from the technical concept of the present invention.

For example, in the above first and second embodiments, the above Z value clearing processing and rendering inhibitions of other objects have been performed at a regular pattern of every other dot (every other mesh). The present invention is not limited to this pattern, and the Z value clearing processing and rendering inhibitions of other objects may be performed on every N dot (N=2, 3 . . . ) such as every two dots (every two meshes) and every three dots (every three meshes), or at a regular pattern of alternately repeating every N dot and every N+L (L=1, 2, 3 . . . ) dot.

For example, in the case where the regular pattern of every other dot (every other mesh) is employed, a degree of semi-transparency becomes 50%, and in the case where the regular pattern of every two dots (every two meshes) is employed, the degree of semi-transparency becomes 25%. Therefore, according to the present invention, it is possible to arbitrarily set the degree of semi-transparency in accordance with various regular patterns.

Besides, the regular pattern is formed into other arbitrary design pattern, in addition to the above-mentioned checkered design pattern, and thereby, it is possible to obtain various images capable of realizing special visible state in addition to the above-mentioned semi-transparency. The arbitrary design pattern may include, for example, design patterns for expressing some drawings or symbols, or for realizing special image effects. For example, when the drawing pattern is employed as the above-mentioned design pattern, the rendering process of such as watermark can be easily realized in the embodiment.

What is claimed is:

1. A rendering method comprising the steps of:
subdividing a frame where a two-dimensional image is formed into predetermined unit areas:
determining an optional area in the frame corresponding to a first object of the two-dimensional image;
determining overwrite rendering is inhibited for at least one of the predetermined unit areas in the optional area, wherein said overwrite rendering provides means for rendering a portion of a second object in an area overlapping the optional area that corresponds to a portion of a second object in the two-dimensional image; and wherein the second object is positioned nearer a virtual viewpoint than the first object and rendering is inhibited in each unit area in the overlapping area for which overwrite rendering is determined to be inhibited;
making a determination that the overwrite rendering is inhibited with respect to each unit ares corresponding to a predetermined pattern of the unit area included in the optional area;
making a determination that the overwrite rendering is inhibited by setting a Z coordinate value indicative of a distance from a virtual viewpoint to be identical to a Z coordinate value of the virtual viewpoint, with respect to the unit area corresponding to the predetermined pattern; and
rendering a predetermined object in the frame;
wherein the optional area is determined based on a rendering range where the predetermined object is rendered.

2. A rendering apparatus comprising:
a subdividing section for subdividing a frame where a two-dimensional image is formed into predetermined unit areas: an area determining section for determining an optional area in the frame corresponding to a first object in the two-dimensional image;
a determining section for determining overwrite rendering is possible for at least one of the predetermined unit areas in the optional area; and
an object rendering section for rendering the first object in the frame;
wherein said overwrite rendering provides means for rendering a portion of the first object in an area overlapping a portion of the optional area that corresponds to a portion of a second object in the two-dimensional image;
wherein the first object is positioned further from a virtual viewpoint than the second object and the first object is rendered in each unit area in the overlapping area for which overwrite rendering is determined to be possible;
wherein the area determining section determines the optional area based on a rendering range where the first object is rendered;
wherein the determining section makes a determination that the overwrite rendering is inhibited with respect to each unit area corresponding to a predetermined pattern of the unit areas included in the optional area; and
wherein the determining section makes a determination that the overwrite rendering is inhibited by setting a Z coordinate value indicative of a distance from a virtual viewpoint to be identical to a Z coordinate value of the virtual viewpoint, with respect to each writ area corresponding to the predetermined pattern.

3. A computer-readable recording medium recording a rendering processing program executed by a computer, rendering processing program comprising:
a subdividing step of subdividing a frame where a two-dimensional image is formed into predetermined unit areas; an area determining step of determining an optional area in the frame corresponding to a
first object in the two-dimensional image;
a determining step of determining overwrite rendering is possible for at least one of the predetermined unit areas in the optional area, the determining step further comprising a step of making a determination that the overwrite rendering is inhibited with respect to each unit area corresponding to a predetermined pattern of the unit area included in the optional area, and a step of making a determination that the overwrite rendering is inhibited by setting a Z coordinate value indicative of a distance from a virtual viewpoint to be identical to a Z coordinate value of the virtual viewpoint, with respect to each unit area corresponding to the predetermined pattern; and a step of rendering the first object in the frame;

wherein said overwrite rendering provides means for rendering a portion of the first object in an area overlapping a portion of the optional area that corresponds to a portion of a second object in the two-dimensional image;

wherein the first object is positioned further from a virtual viewpoint than The second object and the first object is rendered in each unit area in the overlapping area for which overwrite rendering is determined to be possible; and wherein the optional area is determined based on a rendering range where the first object is rendered.

4. A program processor executing a rendering processing program the rendering processing program, comprising:

a subdividing step of subdividing a frame where a two-dimensional image is formed into predetermined unit areas;

an area determining step of determining an optional area in the frame corresponding to a first object in the two-dimensional image;

a determining step of determining overwrite rendering is possible for at least one of the predetermined unit areas in the optional area, the determining step further comprising a step of making a determination that the overwrite rendering is inhibited with respect to each unit area corresponding to a predetermined pattern of the unit areas included in the optional area, and a step of making a determination that the overwrite rendering is inhibited by setting a Z coordinate value indicative of a distance from a virtual viewpoint to be identical to a Z coordinate value of the virtual viewpoint, with respect to each unit area corresponding to the predetermined pattern; and a step of rendering the first object in the frame;

wherein said overwrite rendering provides means for rendering a portion of the first object in an area overlapping a portion the optional area that corresponds to a portion of a second object in the two-dimensional image;

wherein the first object is positioned further from a virtual viewpoint than the second object and the first object is rendered in each unit area in the overlapping area for which overwrite rendering is determined to be possible; and wherein the optional area is determined based on a rendering range where the predetermined object is rendered.

* * * * *